United States Patent Office 3,345,333
Patented Oct. 3, 1967

3,345,333
POLY-(1,3-DIAZOLI-2,4-DIONE/UREAS)
Rudolph J. Angelo, Wilmington, Del., assignor to E. I. du Pont de Nemours and Company, Wilmington, Del., a corporation of Delaware
No Drawing. Filed Mar. 6, 1967, Ser. No. 620,590
8 Claims. (Cl. 260—47)

ABSTRACT OF THE DISCLOSURE

Polymers having the recurring unit

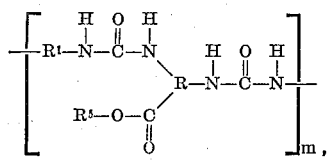

polymers having the recurring unit

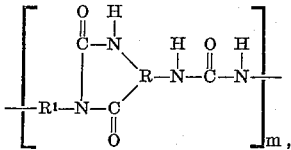

and processes of converting the former to the latter.

RELATED APPLICATIONS

This is a continuation-in-part of my copending application Ser. No. 270,522, filed Apr. 4, 1963, and now abandoned.

SUMMARY OF THE INVENTION

The present invention provides as one novel class of polymers poly(1,3 - diazoli-2,4-dione/ureas), hereinafter called poly(diazolidione/ureas). These polymers are extremely stable at high temperatures and are inert to most solvents at all temperatures. In the form of shaped articles, e.g. films, fibers, rods, tubes, etc., they are substantially colorless, flexible, strong and, in short, have a multitude of desirable properties. Their stability, although a very desirable characteristic in many end uses, makes these polymers very difficult to form into shaped articles. For example, they cannot be melt extruded easily because of their thermal stability as characterized by their high melting points.

Another discovery of this invention overcomes this particular shortcoming and provides a process for producing shaped articles of the poly(diazolidione/ureas). The process involves first forming a shapeable intermediate, then shaping the intermediate into a useful article and, thereafter, converting the intermediate in the form of the shaped article into the stable polymer containing the diazolidione rings.

Specifically, the process involves first forming a polyurea of a diamino, monobasic ester of an organic acid by the reaction of at least one arylene diisocyanate and at least one diamino compound, the latter having one esterified carboxyl group ortho to an amino group when the starting acid is aromatic and being attached to a carbon atom to which an amino group is also attached when the acid is aliphatic, i.e. as close as possible in accordance with the structural limitations of the compound. In the next step, the polyurea is shaped into a useful article, e.g. by casting a film or extruding filaments through a spinneret. Thereafter, the polyurea in the form of the shaped article may be heated so that it converts to the corresponding poly(diazolidione/urea) by the elimination of one molecule of alcohol per diazolidione ring.

The final cyclized products, poly(1,3-diazoli-2,4-dione/urea), are of the following general formula

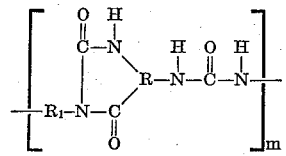

where R is a trivalent organic radical selected from the group consisting of aliphatic radicals of 2 through 8 carbon atoms,

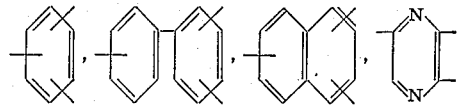

and

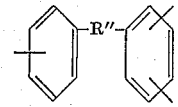

where R″ is selected from the group consisting of methylene, oxygen, sulfur and sulfone, the two valences extending to the left from R in the structural formula being attached to adjacent carbon atoms of an aromatic ring in R when R is aromatic and being attached to the same carbon atom in R when R is aliphatic; $R^1$ is a divalent aromatic radical selected from the group consisting of phenylene, naphthylene, biphenylene, anthrylene, furylene, benzfurylene, fluorenylidene, and

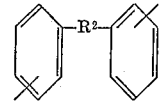

wherein $R^2$ is selected from the group consisting of alkylene of 1–4 carbon atoms, —O—, —S—,

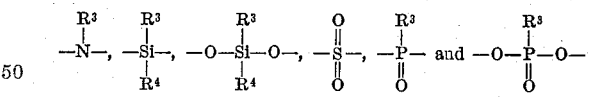

where $R^3$ and $R^4$ are selected from the group consisting of alkyl and aryl, the divalent organic radical being further selected from the group consisting of substituted aromatic R′ radicals wherein the substituents are attached directly to an aromatic ring and are selected from the group consisting of 1 to 2 alkyl radicals of 1–3 carbons each, 1 to 2 alkoxy radicals of 1–2 carbons each, phenoxy and chloro; and m is an integer sufficient to provide a film forming polymer; that is, m is sufficient to provide an inherent viscosity of at least 0.1 as measured at 30° C. as a 0.5% by weight solution in sulfuric acid.

The starting materials in the process are diamino organic, monobasic acids and arylene diisocyanates. The acids are characterized by having the carboxyl group ortho to an amino group when the acid is aromatic and having a pair of carboxyl and amino groups attached to the same carbon atom when the acid is aliphatic. In the process, the carboxyl groups of the diamino, monobasic acid are blocked by esterification in the conventional manner, e.g. with an alcohol, an organic halide in alkaline medium, boron trifluoride and isobutylene, diazomethane, etc., preparatory to reaction with the diisocyanate to form the polyurea.

The diamino, monobasic acids useful in the present invention include: 2,4-diamino benzoic acid; 2,5-diamino benzoic acid; 3-carboxy-4,4'-diamino biphenyl; 3-carboxy-4,4'-diamino biphenyl methane; 1,4-diamino-2-naphthoic acid; 1,5-diamino-2-napthoic acid; 2,6-diamino-1-napthoic acid; lysine ($\alpha,\epsilon$-diaminocaproic acid); ornithine ($\alpha,\delta$-diamino valeric acid); 3,3'-diamino-4-carboxy diphenyl methane; 3-carboxy-4,4'-diamino diphenyl ether; 3,3'-diamino-4-carboxy diphenyl ether; 3-carboxy-4,4'-diamino diphenyl sulfide; 3,3'-diamino-4-carboxy diphenyl sulfide; 3-carboxy-4,4'-diamino diphenyl sulfone; 3,3'-diamino-4-carboxy diphenyl sulfone; $\alpha,\beta$-diamino butyric acid; $\alpha,\gamma$-diamino butyric acid; $\alpha,\gamma$-diamino valeric acid; 1,4-diamino hexahydrobenzoic acid; 2,5-diamino-3-carboxy pyrazine; and 2-carboxy piperazine.

The diisocyanates useful in the present invention are those having the following structural formula:

$$O=C=N-R'-N=C=O$$

wherein R' is as defined hereinbefore. Among the diisocyanates which are suitable for use in the present invention are: metaphenylene diisocyanate; para-phenylene diisocyanate; 2,4-toluene diisocyanate; 4,4'-dimethoxy-3,3'-diisocyanatobiphenyl; 3,3'-dimethoxy-4,4'-diisocyanatobiphenyl; 4-chloro-1,3-phenylene diisocyanate; 1,5-naphthylene diisocyanate; 2,6-naphthylene diisocyanate, bis(4-isocyanatophenyl) methane; bis(4-isocyanatophenyl) ethane; cumene-2,4-diisocyanate; 4-methoxy-1,3-phenylene diisocyanate; 4-phenoxy-1,3-phenylene diisocyanate; 4-ethoxy-1,3-phenylene diisocyanate; 2,4'-diisocyanato diphenyl ether; 4,4'-diisocyanato diphenyl ether; 5,6-dimethyl-1,3-phenylene diisocyanate; 2,4-dimethyl-1,3-phenylene diisocyanate; benzidine diisocyanate (4,4'-diisocyanato diphenyl); 4,6-dimethyl-1,3-phenylene diisocyanate; 1,4-anthracene diisocyanate; furylene-2,5-diisocyanate; 4,4'-diisocyanate diphenyl sulfide; 3,3'-diisocyanato triphenyl amine; 3,3'-diisocyanato diphenyl sulfone; bis-(4-isocyanatophenyl)diethyl silane; phenyl - bis-(3-aminophenyl)phosphine oxide; bis-(isocyanatophenyl) phenylphosphonate; dimethyl-bis-(3-isocyanatophenoxy)silane; 9,10-anthracene diisocyanate; 3,3'-dimethyl-4,4'-diisocyanato diphenyl; 2,5-fluorene diisocyanate; and 2,6-diisocyanato benzfurane. It should be noted that in the preferred diisocyanates, the two isocyanate groups are attached directly to an aromatic ring and may be attached either to the same ring or to different rings.

The first step in the process involves the preparation of a polyurea by the reaction of at least one arylene diisocyanate with at least one diamino monoester of an organic monobasic acid, preferably of an aromatic acid. The esters, prepared from the acids by conventional methods, i.e. reaction with an alchohol of the formula $R^5OH$ wherein $R^5$ is lower alkyl or aryl, have a carboalkoxy or carboaryloxy substituent ortho or alpha to an amino group. Such esters are usually of the carbomethoxy, carbopropoxy, and carbobutoxy variety.

Reaction is generally obtained by first dissolving the diamino compound in an inert solvent, e.g. N-methyl pyrrolidone, dioxane, monochlorobenzene, toluene, dimethylformamide, dimethylacetamide, dimethylsulfoxide, tetramethylene sulfone, carbon tetrachloride, acetone, methyl ethyl ketone, methyl isobutyl ketone, etc. A basic catalyst, usually a tertiary amine e.g. triethylamine, trimethylamine, triisopropylamine, tri-n-butylamine, pyridine, quinoline, isoquinoline, N,N-dimethylaniline, etc. is added followed by the addition of the diisocyanate, usually dissolved in the same solvent used for the diamine. The mixture is then allowed to warm by its own heat of reaction. The time required to produce a polymer is usually 0.5–3 hours but may be more or less depending upon the desired degree of polymerization.

The intermediate polyurea may be represented by the following formula:

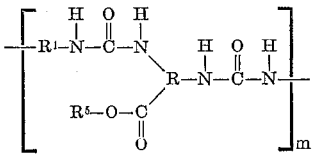

wherein R, R' and $m$ are as hereinbefore defined and $R^5$ is lower alkyl (1–5 carbon atoms) or aryl.

After forming the polyurea, the polymer may be cast or extruded as a film, filament, rod, tube, etc. The shaped article obtained may then be heated to a temperature of at least 200° C. but below the degradation temperature of the final polymer, preferably in a vacuum or inert atmosphere, for a time sufficient to cyclize the polyurea to the poly(diazolidione/urea). The time required for cyclizing will depend upon the particular polyurea and the amount of the polyurea present in the intermediate composition and will vary from a few minutes to an hour or more.

Another method of converting the polyurea article to poly(diazolidione/urea) involves treatment with alcohol-removing compounds that do not affect the starting or final polymer adversely. The treatment is a base catalysis and any of the following materials may be used: alkali alkoxides or alkaline earth alkoxides (e.g. potassium tertiarybutoxide, sodium methoxide, magnesium isopropoxide), alkali carbonates (sodium carbonate, potassium carbonate), alkali hydrides (lithium hydride, sodium hydride, potassium hydride). The chemical converting agents are usually applied from solution in a suitable solvent, e.g. ethanol. Still another method of converting the polyurea to poly(diazolidione/urea) involves both chemical addition and heat, the heat usually being applied subsequent to the chemical treatment.

It should be understood that the intermediate polymer for shaping need not be composed completely of polyurea. Some of the cyclic product may be present. However, the intermediate polymeric composition must contain sufficient polyurea to be shapeable.

It should be understood that the sulfur analogs may be substituted for the diamino compounds and/or the diisocyanates in the process of this invention. In this manner, a diamino, thio or thiol or dithio acid ester and/or a diisothiocyanate may be substituted for all or part of the carboalkoxy diamino compound and/or diisocyanate to prepare the intermediate that eventually leads to a poly(diazolidione/urea) having one or more oxygen atoms replaced by sulfur atoms.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [1] known to those skilled in the art. The majority of the infrared spectra herein were taken on pressed films by the use of a Perkin-Elmer Model 21 Spectrophotometer and a Perkin-Elmer Infracord Spectrophotometer.

---
[1] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

Inherent viscosity, which is directly related to the molecular weight of the polymer is defined by L. H. Cragg in the Journal of Colloid Science, volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and C is the concentration of solute in solution measured as grams of polymer per 100 ml. of solution.

Example 1

Alpha, epsilon-diamino caproic acid (0.105 mole) is slurried in 125 ml. of absolute ethanol which has been saturated with dry hydrogen chloride gas to produce a yellow solution of the dihydrochloride of the diamino ester.

This dihydrochloride of the diamino ester (0.005 mole) is dissolved in 5 ml. of N,N-dimethylacetamide with warming on a steam bath. To this is added a solution of 1.010 g. of triethylamine in 2 ml. of N,N-dimethylacetamide, giving immediate precipitation of white triethylamine hydrochloride. After the addition of 2 ml. more of N,N-dimethylacetamide, a solution of 1.250 g. (0.005 mole) of bis-4-isocyanatophenyl) ether in 5 mls. of N,N-dimethylacetamide is introduced. Both temperature and viscosity increase the temperature to about 60° C. The resulting bright yellow solution (still containing solid triethylamine hydrochloride) is stirred while it cools to room temperature.

The triethylamine hydrochloride is removed by filtration, and the clear, yellow, somewhat viscous solution is cast onto a glass plate and dried in a 165° C. oven to give a clear, fairly tough, flexible film. The infrared spectrum of this polymer confirms that it is the polyurea:

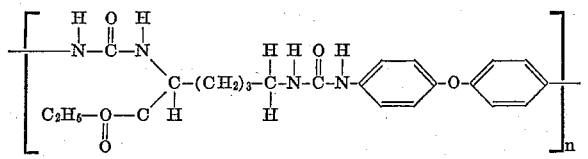

Heating at 200° C. for 15 minutes and 310° C. for 7 minutes produces a good, strong film whose infrared spectrum provides evidence of cyclization to the desired heterocyclic polymer:

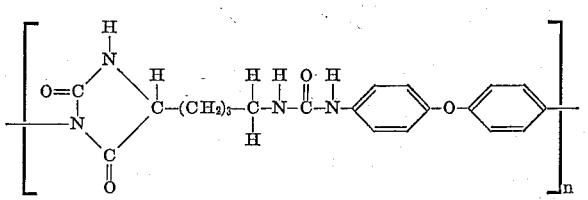

Example 2

Another sample of the polyurea of Example 1, prepared in a similar manner, is converted to the same polyimidazolinedione by chemical means. This involves submersing the polyurea film in a 0.2% by weight solution of potassium t-butoxide in absolute ethanol. A good film results.

Example 3

A film having the following chemical structure results from substituting 2,4-diaminobenzoic acid and toluene-2,4-diisocyanate in the same molar amounts for the diamine and diisocyanate used in the procedure of Example 1:

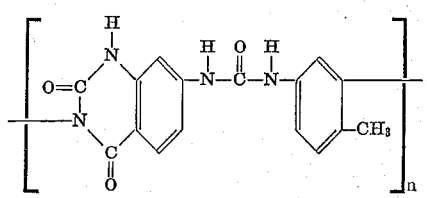

This film has good high temperature properties.

Likewise, substitution of alpha,delta-diamino valeric acid for the diamino caproic acid in Example 1 leads to a similar product.

The poly(diazolidione/ureas) of this invention find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors in the preferred process of preparation, these polymer precursors may be processed into shaped articles such as films, fibers, tubes, rods, sheets and discs by conventional techniques, and then converted into the final high-melting, relatively intractable cyclized polymer, the poly(diazolidione/urea).

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in an extensive variety of wrapping, packaging and bundling applications. Additionally, the film-forming polymer may be used in automobile and aviation interior head lining materials, decorative trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gusseting materials, brake linings and clutch facings.

What is claimed is:

1. Poly(1,3-diazoli-2,4-dione/urea) having the structural formula

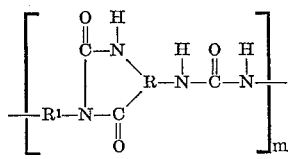

where R is a trivalent organic radical selected from the group consisting of aliphatic radicals of 2 through 8 carbon atoms,

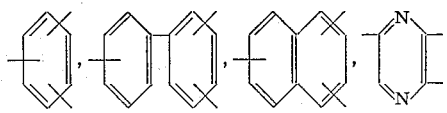

and

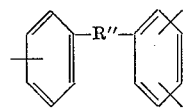

where R'' is selected from the group consisting of methylene, oxygen, sulfur and sulfone; the two valences extending to the left from said R being attached to adjacent carbon atoms of an aromatic ring in R when R is aromatic and being attached to the same carbon atom in R when R is aliphatic; $R^1$ is a divalent aromatic radical selected from the group consisting of phenylene, naphthylene, biphenylene, anthrylene, furylene, benzfurylene, fluorenylidene, and

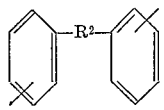

wherein $R^2$ is selected from the group consisting of alkylene of 1–4 carbon atoms, —O—, —S—,

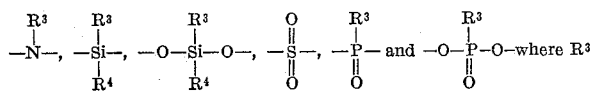

and $R^4$ are selected from the group consisting of alkyl and aryl, said $R^1$ being further selected from the group consisting of substituted aromatic $R^1$ radicals wherein the substituents are attached directly to an aromatic ring and are selected from the group consisting of 1 to 2 alkyl radicals of 1 to 3 carbons each, 1 to 2 alkoxy radicals of 1 to 2 carbons each, phenoxy and chloro; and $m$ is an integer sufficient to provide an inherent viscosity of at least 0.1 as measured at 30° C. as a 0.5% by weight solution in sulfuric acid.

2. Poly(1,3-diazoli-2,4-dione/urea) as in claim 1 wherein R' is

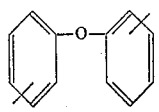

3. Poly(1,3-diazoli-2,4-dione/urea) as in claim 1 wherein R' is toluylene.

4. Poly(1,3-diazoli-2,4-dione/urea) as in claim 1 wherein R is

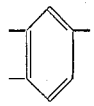

5. Poly(1,3-diazoli-2,4-dione/urea) as in claim 1 wherein R is

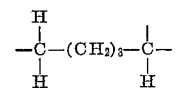

6. Poly(1,3-diazoli-2,4-dione/urea) as in claim 1 wherein R is

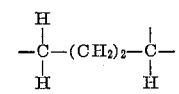

7. A polyurea having the structural formula

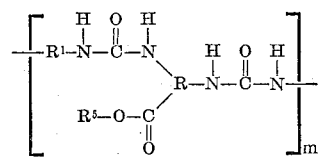

where R is a trivalent organic radical selected from the group consisting of aliphatic radicals of 2 through 8 carbon atoms,

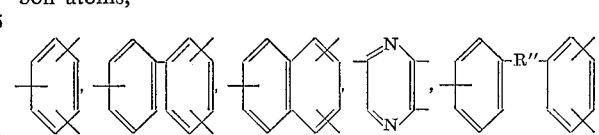

where R'' is selected from the group consisting of methylene, oxygen, sulfur and sulfone; the two valences extending to the left from said R being attached to adjacent carbon atoms of an aromatic ring in R when R is aromatic and being attached to the same carbon atom in R when R is aliphatic; $R^1$ is a divalent aromatic radical selected from the group consisting of phenylene, naphthylene, biphenylene, anthrylene, furylene, benzfurylene, fluorenylidene, and

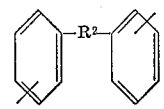

wherein $R^2$ is selected from the group consisting of alkylene of 1–4 carbon atoms, —O—, —S—,

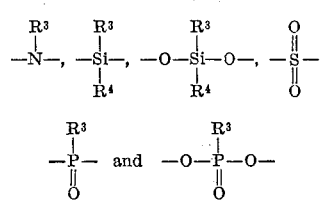

where $R^3$ and $R^4$ are selected from the group consisting of alkyl and aryl, said $R^1$ being further selected from the group consisting of substituted aromatic R' radicals wherein the substituents are attached directly to an aromatic ring and are selected from the group consisting of 1 to 2 alkyl radicals of 1 to 3 carbons each, 1 to 2 alkoxy radicals of 1–2 carbons each, phenoxy and chloro; $R^5$ is selected from the group consisting of alkyl of 1–5 carbon atoms and aryl; and $m$ is an integer sufficient to provide an inherent viscosity of at least 0.1 as measured at 30° C. as a 0.5% by weight solution in sulfuric acid.

8. A composition comprising (1) the polyurea of claim 7 and (2) a solvent therefor.

References Cited

UNITED STATES PATENTS

| | | | |
|---|---|---|---|
| 2,502,548 | 4/1950 | Allen et al. | 260—78 |
| 3,242,128 | 3/1966 | Chalmers | 260—32.6 |
| 3,244,675 | 4/1966 | Angelo | 260—77.5 |
| 3,261,811 | 7/1966 | Tatum | 260—47 |
| 3,271,366 | 9/1966 | Kreuz | 260—47 |
| 3,278,493 | 10/1966 | Angelo | 260—77.5 |
| 3,282,898 | 11/1966 | Angelo | 260—47 |

FOREIGN PATENTS 1,105,606    4/1961    Germany.

DONALD E. CZAJA, *Primary Examiner.*

F. McKELVEY, *Assistant Examiner.*